Patented Apr. 20, 1943

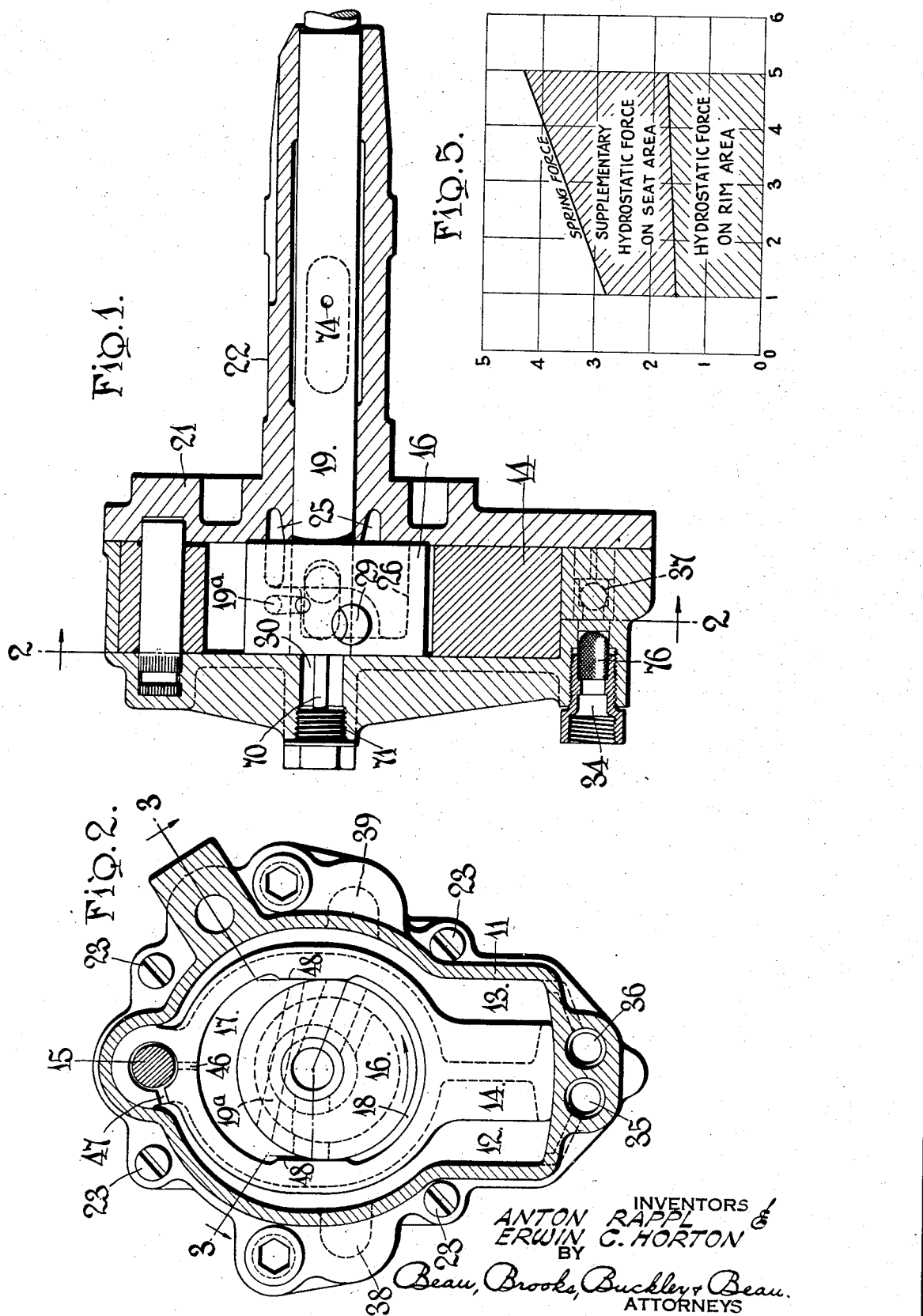

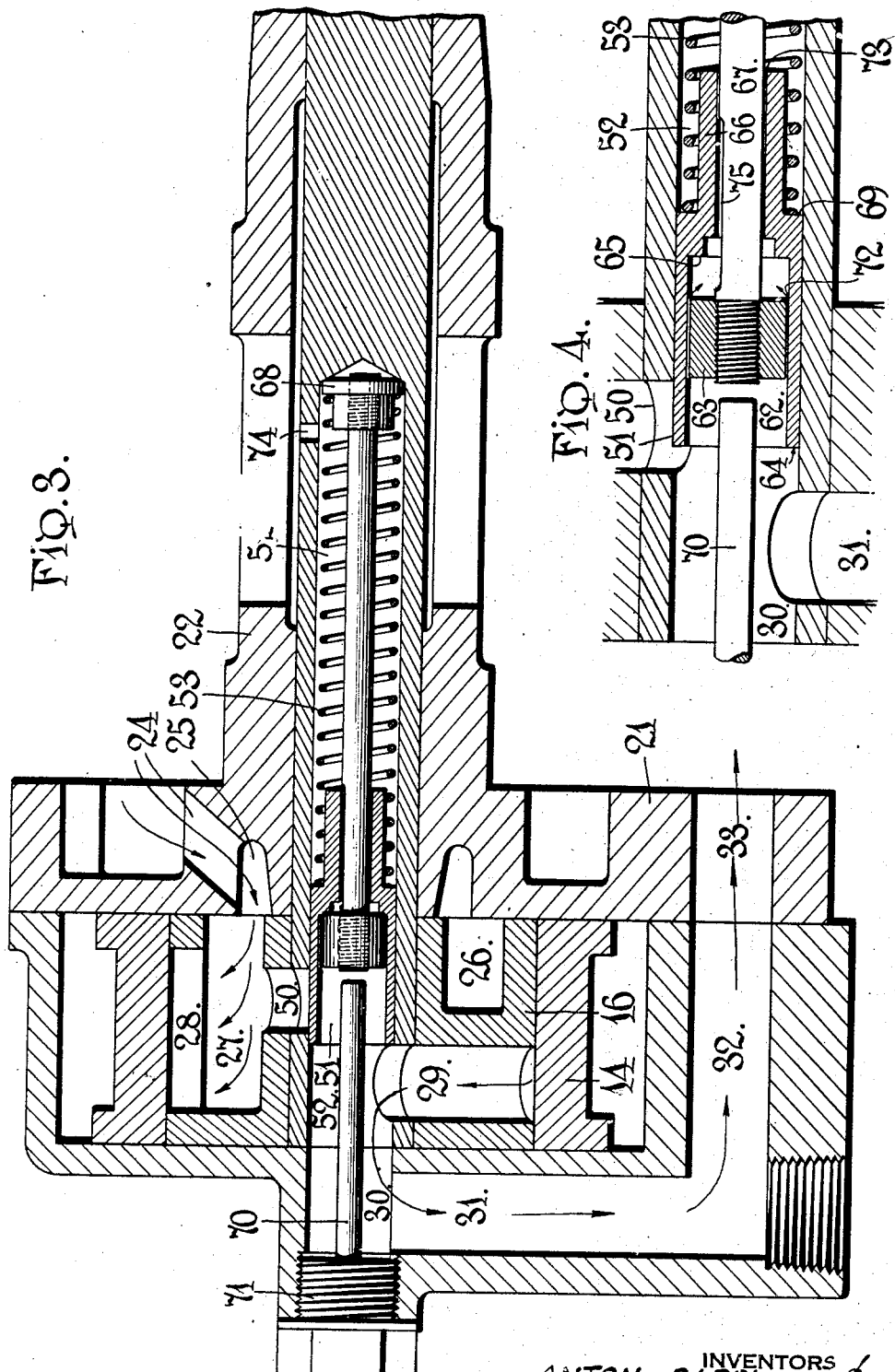

2,317,332

UNITED STATES PATENT OFFICE 2,317,332

PRESSURE RELIEF VALVE

Anton Rappl, Buffalo, and Erwin C. Horton, Hamburg, N. Y., assignors to Trico Products Corporation, Buffalo, N. Y.

Application August 2, 1939, Serial No. 287,978

5 Claims. (Cl. 137—53)

This invention relates to a pressure relief valve for use in a fluid pressure system.

In systems of this character, especially those having a wide range of fluctuations, difficulty has been experienced in regulating the system to maintain uniformity in the performance thereof.

The object of the present invention is to provide a pressure relief valve which will be highly efficient in performance under varying conditions of usage, and further to provide a valve having great flexibility in meeting the varying demands and requirements of the system wherein the pressure is regulated by the improved valve serving in the capacity of a relief valve.

In the drawings depicting the now preferred embodiments of the invention

Fig. 1 is a cross sectional showing of the valve as embodied in a pump, by way of example, with portions remaining in elevation;

Fig. 2 is a transverse sectional view therethrough about on line 2—2 of Fig. 1;

Fig. 3 is an enlarged and irregular sectional view about on line 3—3 of Fig. 2;

Fig. 4 is a similar view, in fragment, depicting the pressure relief valve in a partially opened position;

Fig. 5 is a graph comparing the supplementary hydrostatic force with the direct hydrostatic force in their effect on the by-passing valve;

Figure 6:
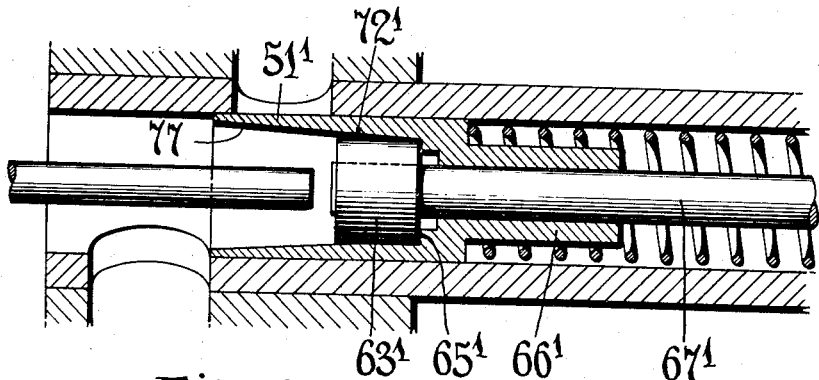
Fig. 6 is a fragmentary view depicting a modified form of the pressure relief valve.

Referring more particularly to the drawings, the improved pressure relief valve is capable of widespread use and has herein been illustrated as adapted for fluid systems of different types. The valving arrangement of the present invention includes a valve part which is normally closed but adapted to yield upon the fluid in the system reaching a substantially predetermined degree to open a by-pass for the relief of the excess pressure, pressure responsive means being provided to assist the opening of the valve, the arrangement being such that the assisting means is normally unaffected by the fluid pressure but is subjected to its action by movement of the valve part from its closed position.

One depicted use of the pressure relief valve is in a pump, such as that employed in the force feed lubricating system of an automotive power plant. Figs. 1 through 4 illustrate such a pump as having a housing 11 divided into chambers 12 and 13 by an air displacing member 14 which has the form of a vane-like piston pivotally mounted on a pin 15 for oscillatory movement. The air displacing vane or piston 14 is itself formed with a compartment in which operates a piston 16 to alternately ensmall and enlarge the chambers 17 and 18 separated thereby. The piston 16 is fixed eccentrically on a drive shaft 19, as by a tapered pin 19a. The housing 11 is of cup formation and has its rear or upper side, as viewed in Fig. 1, closed by a cover plate 21 in which is formed the bearing 22 for shaft 19, the component sections of the housing being held together by suitable means, such as screws 23.

Rotary movement of the shaft 19 will impart like fluid displacing movement to the eccentric piston 16 and oscillatory fluid displacing movement to the chambered piston 14. Where the pump is used for displacing two different fluids, such as oil and gas, individual ports will be provided for the different fluids. For this purpose the back or mounting plate 21 may be provided with an inlet opening 24 leading to an inlet port 25 which is in the form of an annular recess about the shaft 19. This annular port is in substantial registry with an annular facial recess 26 in the eccentric piston 16, which communicates through a duct 27 with a radial inflow passage 28 that discharges through the periphery of the eccentric piston at the low pressure or intaking side thereof so as to discharge the liquid into the enlarging one of the two chambers 17 and 18. The pressure or forward side of the rotating piston is provided with a radial outflow passage 29 leading from the periphery of the piston and discharging through an axial passage 30 into a wall passage 31 of the pump housing, which communicates through a side wall duct 32 and thence through an outlet opening 33 in the mounting plate where delivery connection may be made. The two fluid displacing members 14 and 16 have sliding fit with the housing walls and the clearance therebetween is sealed by the liquid that is being acted upon.

For the air or gas section of the pump the housing may be formed with an inlet port 34 which contains a filter 76 and also branches into chamber passages 35 and 36 leading respectively to the air chambers 12 and 13 and each provided with a ball check valve 37 to effect unidirectional flow into such chambers. The air, together with any spent sealing oil, will exhaust from the chambers through outlet ports 38 and 39, provided with suitable check valves.

For lubricating the journal support of the vane piston on the pin 15 a groove 46 is provided in one side face of the vane to establish communication between the oil chamber 17 and one end of the pin bearing. The opposite face of the piston is formed with a facial groove 47 establishing communication between the opposite end of the pin bearing and one of the air chambers.

This will enable the pressure differential between the chamber 17 and the air chamber, when under compression in the former, to cause a restricted flow of the lubricant through the groove 46, along the pin within its bearing, and out through the groove 47 into the air chamber where it may further serve to seal the sliding contact between the vane piston and the walls of the housing.

Wear pads 48 are provided for receiving the thrust from the eccentric piston 16. These pads, if desired, may be separable inserts and afford hardened surfaces by which close tolerances between the vane and its driving eccentric are more easily maintained throughout the life of the pump.

From the foregoing it will be observed that the eccentric piston operates in a dual capacity, first in the direct pumping of one fluid by alternately enlarging and ensmalling the chambers 17 and 18 and secondly in the actuation of the swinging piston through the camming action of the eccentric thereon for the indirect pumping of another fluid.

It has been found that owing to the incompressibility of liquid an objectionably high pressure will develop in the chambers 17 and 18 as the eccentric piston approaches its innermost position. This subjects the parts to excessive strain and produces a pounding noise which prevents a quiet pump. To remedy this, means are provided to limit the extent of pressure build-up in the oil chambers beyond a predetermined degree. This important phase of the invention is taken care of effectively by relieving the excess pressure through a by-pass from the pressure side of the eccentric to the intaking side thereof. This by-pass comprises a relief port 50 which discharges into the radial inflow passage 28 and which is normally closed or interrupted by the improved pressure relief valve designed to open the interchamber communication after a predetermined pressure build-up in the pumping or active one of the chambers 17, 18.

The pressure relief valve has a main or primary valve 51 and also a secondary valve 65, the former sliding in an axial bore 52 of the eccentric piston 16 and being yieldably held closed by a backing spring 53. The valve 51 is of special design, having a chamber 62, for a fixed head 63, and a valving rim 64. The bottom of the chamber 62 has an annular seat which serves as the secondary valve 65 and is normally engaged with the underside of the head 63 to close the axial passage 73 through the valve 51. A sleeve extension 66 on the valve slidably receives the stem 67 which supports the head 63 at one end and a collar 68 at the opposite end, the spring 53 being confined under compression between the collar 68 and a shoulder 69 on the valve 51. The degree of compression may be regulated by threading either the collar or head, or both, on the stem.

The valve unit thus formed is placed in the axial bore 52 where it will be held by the fluid pressure after once the pump has been started. To hold the valve unit at other times against sliding over and closing the outflow passage 29 a locating pin 70 is provided to extend into the chamber 62 in proximity to the head 63, this pin being carried by a screw plug 71 in the housing.

A predetermined definite clearance about the head 63 is provided, as indicated at 72, for the slippage of fluid when the valving seat 65 is removed from the head. Likewise, a predetermined and definite clearance is provided between the sleeve 66 and the stem 67 for the escape of fluid through the bore 52. This arrangement provides a restricted shunt passage opening through the vent 74 back into the reservoir where the pressure is atmospheric. A flat face 75 on the rod is provided in extent substantially equal to or slightly greater than the sleeve 66 and is disposed normally to be coextensive with the sleeve so that when the secondary valve 65 opens the clearance will be greatest, and as the valve recedes the clearance will accordingly decrease and the resistance to the slip flow through the valve inversely increase. Obviously, should the sleeve entirely uncover the flat face, which under some uses may be desirable, the clearance will thereafter remain fixed or constant. The fixed clearance is preferably less than clearance 72 about the head to accentuate a pressure build-up on the area of the secondary valve 65 when the latter is exposed to fluid pressure. This pressure on the secondary valve supplements the working pressure on the area of rim 64 but will not manifest itself until the secondary valve disengages the head.

By reason of the slip flow of fluid through the valve 51 the supplementing pressure on the secondary valve will be intermediate the working pressure and the atmosphere. This supplemental pressure is developed within what might be termed a supplemental pressure chamber which increases in size as the valve 65 recedes from the head 63. As the valve recedes the clearance or area of the fluid passage about the stem 67 will decrease relative to the fixed area about the head and result in an increase in the supplementing pressure on the secondary valve area. This supplementing intermediate pressure differential operating on the valve tends to offset the increase in the balancing pressure of the backing spring.

The operation of this valve is such that under normal pumping the oil which is subjected to pressure in either chamber 17 or 18 will leave such chamber through the outflow passage 29 and discharge through the wall passage 31. As the piston 16 approaches its innermost position, at which time the pressure on the confined body of liquid will rise rapidly and become quite excessive, the pressure will act on the outer constantly exposed rim area of the valve 51 and force the latter inwardly against the urge of spring 53 to open the by-pass and thereby relieve the confined body of liquid of excessive pressure by permitting a portion of the liquid, beyond that which can be accommodated by the outlet 29 at the given pressure, to escape through the relief port 50 into the intaking chamber along with the fresh inflowing stream entering through the duct 27. Up to a given internal pressure, as predetermined by the spring, the secondary valve area is not exposed to such internal fluid pressure and consequently is unaffected thereby but immediately upon the valve unseating itself the additional surface area is exposed to the relatively reduced pressure of the by-passing flow to be acted upon in supplement to the direct pressure which is acting on the valve rim. This supplementary pressure is designed to increase upon further recession of the valve as the spring pressure increases for proportionately enhancing its counteracting tendency.

This pressure relief valve, therefore, provides means which are responsive to the direct pressure for exposing the pressure supplementing means tending toward more fully counteracting the spring pressure. The rim area is that area of the valve 51 which is constantly exposed to the direct pressure in the pumping chamber and will comprise the area of the rim as well as any exposed area not covered by the head 63. The seat or secondary valve area is that portion of the bottom of the valve between the stem 67 and the outer diameter of the fixed head 63.

By having the by-pass within the rotating eccentric piston the fluid cross flow is always in the same direction with respect to the piston and the chamber in which the liquid is being subjected to pressure is relieved in accordance with the setting of the spring 53. Not until the start of the recession movement of the valve 51 is there an intermediate pressure available for creating the supplementary pressure, which latter pressure varies increasingly with a continued recession so as to add to the hydrostatic working pressure on the rim area a supplemental hydrostatic assistance that preferably is sufficient nearly to counterbalance the increase in the balancing spring pressure incidental to such recession. It is this supplementing pressure which acts to offset the increase in the balancing spring pressure with the result that the working pressure in the chambers 17 and 18 is confined to a smaller range, having narrower working limits. The pump will, therefore, have a more uniform flow of liquid in which the pulsations will be less pronounced and will result in lengthening the period of usefulness of the pump.

In this connection and as indicated on the graph in Fig. 5, the hydrostatic working pressure on the rim area remains substantially constant; the slip flow friction on the surface of the restricted passage through the valve is practically constant, while the intermediate pressure effective on the secondary valve area changes in proportion to the capacity of the restricted passage which is determined by the position of the sleeve 66 and, of course, the degree of working pressure.

In Fig. 6 is depicted a modification of the pressure relief valve wherein the clearance between the sleeve 66' and the stem 67' remains constant or fixed while that about the head 63' varies by increasing during recession of the primary valve 51'. This is accomplished herein by providing the inner side wall of chamber 62' with an outward flare, as indicated at 77, so that as the primary valve recedes the restriction 72' will diminish to permit a greater slip flow past the head. Consequently, the intermediate pressure build-up on the secondary valve area 65' will increase due to the fixed restriction through the sleeve 66'.

Figure 7:
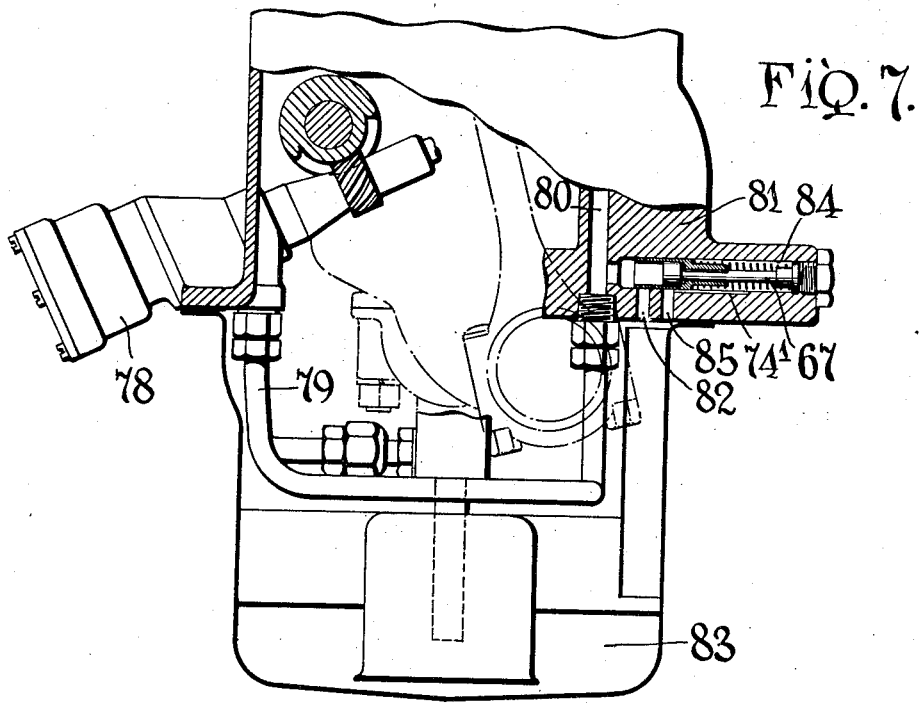
Fig. 7 illustrates a further adaptation of the valve as incorporated in the lubricating system of a motor vehicle engine.

A further use to which the pressure relief valve may be put, of which there are many, is disclosed in Fig. 7 wherein the pump 78 of the force feed lubricating system delivers the oil through a pipe 79 to a passage 80 in the engine body 81. When the delivery pressure becomes excessive the pressure regulating valve functions to open more or less a by-pass 82 which returns the excess oil to the crankcase 83. The relief valve depicted is similar in design to that first described herein which has the flat on the stem 67. The atmospheric port 74', however, is formed in the wall of the bore 84 and discharges back into the crankcase through passage 85.

Obviously, the secondary valve does not have to seat or fully close off the communication between the system pressure and the restricted passage since the intermediate pressure will function in a like manner in either instance. However, for practical reasons the complete interruption is desirable for greatest efficiency and to avoid loss of liquid from the active flow through the system.

In both forms of the valve just described the variable operating pressure in the system is supplemented by a variable assisting pressure to equal the variable spring pressure.

While the foregoing description has been given in detail, it is obvious that the inventive principles herein involved may assume other physical embodiments without departing from the spirit of the invention set forth and claimed.

What is claimed is:

1. A pressure relief valve for relieving excess pressure in fluid systems, comprising a body having a chamber, an inlet leading thereto and a relief passage leading therefrom, a valve in the chamber constantly receptive to the chamber pressure, resilient means urging the valve to a position for closing the relief passage, a restricted shunt passage leading from the chamber through the valve and normally shut by a part of the valve when closed but adapted to be opened thereby prior to opening the relief passage for permitting a restricted outflow of fluid creating an intermediate pressure to act upon the valve in a supplementary capacity toward counteraction of any increase in the resistance of said resilient means, and means for increasing the restriction of the shunt passage in accordance with an increase in the resistance of said resilient means to further opening movement of the valve whereby the intermediate pressure will be augmented to function in its counteracting capacity.

2. A pressure relief valve comprising a body having a chamber with a relief passage leading therefrom, a valve arranged in the body for closing the passage and receptive to the pressure in the chamber, a backing spring for the valve normally urging and yieldably holding the valve in a position to close the passage, said valve being yieldable against the spring pressure upon the fluid pressure in the chamber reaching a substantially predetermined degree sufficient to initially counterbalance the spring pressure, a second valve movable with the first valve and forming therewith a unitary body of tubular formation to permit the escape of fluid therethrough from the chamber, and a fixed head arranged within the tubular body against which the second valve seats under the action of said spring, said head having a stem on which the tubular valve slides, there being a predetermined clearance between the stem and the tubular valve increasing in restriction as the latter recedes from its normal position in accordance with increased chamber pressure whereby to augment the direct fluid pressure in counteracting the build-up in the balancing spring pressure in proportion to the build-up of the backing spring pressure.

3. A pressure relief valve comprising a body having a chamber and a relief passage, a tubular valve arranged in the body, a backing spring for the valve normally urging and yieldably holding the valve in a position to close the relief passage, the tubular valve being provided with a bottom seat of annular form through which a shunt communication is established leading from the chamber, and a head arranged within the tubular valve against which the seat is pressed by the spring, said head having a supporting stem extending through the annular seat, said head and stem providing a predetermined restriction for the slip flow of fluid therethrough when the seat is disengaged from the head and said stem having a variable cross section over which the tubular valve moves for varying the flow restriction in proportion to the build-up in the spring pressure.

4. A pressure relief valve comprising a body having a chamber and a relief passage, a tubular valve arranged in the body, a backing spring for the valve normally urging and yieldably holding the valve in a position to close the relief passage, the tubular valve being provided with a bottom seat of annular form through which a shunt communication is established leading from the chamber, and a head arranged within the tubular valve against which the seat is pressed by the spring, said head having a supporting stem extending through the annular seat, said head and stem providing a predetermined restriction for the slip flow of fluid therethrough when the seat is disengaged from the head, the inner wall of the tubuluar valve flaring outwardly so as to reduce the flow restriction as the valve opens.

5. A pressure relief valve comprising a body having a chamber with a relief passage leading therefrom, a valve arranged in the body for closing the passage and receptive to the pressure in the chamber, a backing spring for the valve normally urging and yieldably holding the valve in a position to close the passage, said valve being yieldable against the spring pressure upon the fluid pressure in the chamber reaching a substantially predetermined degree sufficient to initially counterbalance the spring pressure, a second valve movable with the first valve and forming therewith a unitary body of tubular formation to permit the escape of fluid therethrough from the chamber, and a fixed head arranged within the tubular body and having a supporting stem extending through one end thereof, said second valve being formed on the inside of the tubular body about the stem and engaging an underface of the head for receding therefrom against the action of the backing spring whereby when the second valve recedes from the head a supplemental pressure chamber will be provided between the second valve and the underface increasing in size as the recession proceeds, said head and tubular body having a pair of opposing surfaces defining a predetermined clearance about the periphery of the head at one side of the second valve supplemental pressure chamber, said tubular body having a tubular extension through which the stem extends, the extension and stem having a pair of opposing surfaces defining a predetermined clearance at the opposite side of the supplemental pressure chamber, one pair of opposing surfaces having its clearance varying in accordance with the recession of the second valve to effect a gradual pressure reaction in the supplemental chamber in substantial counteraction to the increase in the resilient urge of the backing spring during valve recession.

ANTON RAPPL.
ERWIN C. HORTON.